United States Patent [19]

Duflot

[11] Patent Number: 5,424,418
[45] Date of Patent: Jun. 13, 1995

[54] LOW-CALORIE SOLUBLE GLUCOSE POLYMER AND PROCESS FOR PREPARING THIS POLYMER

[75] Inventor: Pierrick Duflot, Richebourg, France

[73] Assignee: Roquette Freres, Lestrem, France

[21] Appl. No.: 135,434

[22] Filed: Oct. 13, 1993

[30] Foreign Application Priority Data

Oct. 16, 1992 [FR] France ............... 92 12447

[51] Int. Cl.⁶ .................. C08B 37/16; C13K 1/06
[52] U.S. Cl. .................. 536/103; 536/123.1; 536/127; 127/38; 127/39; 127/40
[58] Field of Search ............ 536/103, 123.1, 127; 127/38, 39, 40

[56] References Cited

U.S. PATENT DOCUMENTS

| | | |
|---|---|---|
| 2,436,967 | 3/1948 | Leuck . |
| 2,719,179 | 9/1955 | Mora et al. . |
| 2,985,589 | 5/1961 | Broughton . |
| 3,044,904 | 7/1962 | Serbia et al. . |
| 3,416,961 | 12/1968 | Mountfort et al. . |
| 3,692,582 | 9/1972 | Melaja . |
| 3,766,165 | 10/1973 | Rennhard et al. . |
| 4,157,267 | 6/1979 | Odawara et al. ............ 127/46 A |
| 4,182,633 | 1/1980 | Ishikawa et al. ............ 127/46 A |
| 4,226,977 | 10/1980 | Neuzil et al. ............ 536/1 |
| 4,293,346 | 10/1981 | Landis et al. ............ 127/46 A |
| 4,332,623 | 6/1982 | Ando et al. ............ 127/46.2 |
| 4,405,455 | 9/1983 | Ando et al. ............ 127/46.2 |
| 4,412,866 | 11/1983 | Schoenrock et al. ............ 127/46.2 |
| 4,422,881 | 12/1983 | Devos et al. ............ 127/46.1 |
| 4,622,233 | 11/1986 | Torres ............ 426/548 |
| 4,965,354 | 10/1990 | Yanaki et al. ............ 536/124 |
| 5,051,500 | 9/1991 | Elmore ............ 536/50 |
| 5,314,701 | 5/1994 | Mentink et al. ............ 426/103 |

FOREIGN PATENT DOCUMENTS

| | | |
|---|---|---|
| 0289461 | 11/1988 | European Pat. Off. . |
| 0342156 | 11/1989 | European Pat. Off. . |
| 0368451 | 5/1990 | European Pat. Off. . |
| 0380248 | 8/1990 | European Pat. Off. . |
| 0458748 | 11/1991 | European Pat. Off. . |
| 0473333 | 3/1992 | European Pat. Off. . |
| 2352829 | 7/1980 | France . |
| 1295396 | 7/1971 | United Kingdom . |
| 1596911 | 5/1978 | United Kingdom . |
| WO92/12179 | 7/1992 | WIPO . |
| WO92/14761 | 9/1992 | WIPO . |

*Primary Examiner*—Nathan M. Nutter
*Attorney, Agent, or Firm*—Larson and Taylor

[57] ABSTRACT

The invention relates to a soluble glucose polymer predominantly composed of 1-6 bonds, having a content of reducing sugars of less than 0.5%, as well as a content of products of mollecular weight less than or equal to 182 g, of less than 1%. The invention also relates to the process for preparing this glucose polymer, consisting in subjecting a glucose polymer to a hydrogenation stage and to a molecular sieving state so as to remove the products of molecular weight less than or equal to 182 g.

12 Claims, 2 Drawing Sheets

LOW-CALORIE SOLUBLE GLUCOSE POLYMER AND PROCESS FOR PREPARING THIS POLYMER

The present invention relates to a low-calorie soluble glucose polymer in which the 1-6 bonds are predominant, which is heat-stable and which is ordorless, colorless and tasteless.

The present invention also relates to a process for preparing this polymer and also relates to the food and pharmaceutical products containing it. Other characteristics and advantages will emerge on reading the present description.

Glucose, optionally mixed with polyols, can be polymerized by heating in the presence of inorganic or carboxylic acids according to processes which have already been described for example in U.S. Pat. Nos. 2,436,967; 2,719,179 and 4,965,354 in the case of the inorganic acids or U.S. Pat. Nos. 3,766,165 and 5,051,500 in the case of the carboxylic acids.

The soluble polyglucose compounds obtained, predominantly composed of 1-6 bonds and atypical 1-2, 1-3 bonds are not very digestible.

Their low calorific value, which is unanimously thought to be close to 4.18 KJoule/g (that is to say 1 Cal/gram), and their technological properties, which are similar to those of sucrose, make them a candidate for replacing this sugar as filler, inert products for which the total absence of sweet taste can even prove to be an advantage.

However, the polymers thus obtained have numerous disadvantages which do not allow them to find a use as universal as possible as filler in food products.

Such an ideal filler should indeed be totally neutral as regards taste, that is to say that it should be neither sour, nor salty, nor bitter, nor sweet, it should also be totally colorless, as low in calories as possible, non-cariogenic, heat-stable and not cause Maillard reactions which give rise to brown compounds in the presence of proteins or amino acids.

Processes designed for producing products whose behavior might be similar to this ideal filler have therefore been developed. However, none of these processes has made it possible to obtain, up until now, products having all the required qualities.

Accordingly, it has been proposed in U.S. Pat. No. 3,766,165, in order to reduce the color of the polyglucose compounds during their formation, that there is added to the glucose a dietary polyol such as sorbitol, most of which in fact becomes incorporated into the polyglucose which forms. The products thus obtained are known and marketed under the name "Polydextrose".

However, these products are still intensely colored and are not heat-stable. They are, in addition, still bitter and either sour or salty. They are not as low in calories as possible since they sitll contain unreacted glucose and sorbitol as well as compounds whose low molecular weight causes drawbacks in certain specific applications.

These low molecular weight products are indeed not highly viscosity-promoting and do not act as filler: they lack body. Moreover, they are hydgroscopic and lower very substantially the equilibrium relative humidity (ERH) of compositions containing them. Some of their degradation products, such as for example levoglucosan, are in addition vary bitter.

It was therefore proposed by U.S. Pat. No. 4,622,233, to treat the polydextrose obtained according to the preceding patent, whichis therefore a copolymer of glucose, sorbitol and citric acid, with oxidizing agents in order to reuce its color and to precipitte it using organic solvents so as to remove therefrom a portion of the monomers and the levoglucosan. However, the product obtained is not heat-stable since it is easily recolored and it is not completely free of bitterness. It still contains, in addition, compounds of low molecular weight whose disadvantages have already been stated.

European Patent Application No. 289,461 also proposes to treat polydextrose with organic solvents so as to purify it and decolorize it, but it also results in a product having the same disadvantages as those which were stated in the preceding paragraph.

European Patent Application No. 342,156 proposes to remove the compounds of low molecular weight: glucose, sorbitol, citric acid, anhydroglucose, hydroxymethylfurfural, by reverse osmosis. However, the product obtained is intensely coored since the colors are due to compounds of high molecular weight which are not removed by the membrane and this product is not heat-stable.

European Patent Application No. 380,248 proposes to treat the polydextrose with adsorbent or weakly anionic resins so as to lower its free and esterified citric acid content and claims thereby to enhance its taste. However, the product obtained still contains compounds of low molecular weight and is not completely free of bitterness; it is still colored and is not heat-stable.

European Patent Application No. 458,748 proposes a process similar to the preceding one and also results in a product having the same disadvantages.

European Patent Application No. 473,333, by a process using several resins of different functionalities, claims to lower, to the detection limit, the residual free and esterified citric acid contents of the polydextrose and asserts obtention of a product with reduced bitterness. But the product obtained still contains compounds of low molecular mass, is still colored and is still not heat-stable.

Patent Application PCT WO 92/12179, by a molecular sieving process on cationic resins which retain the small molecules, makes it possible to obtain a product similar to that obtained by the process according to European Patent Application No. 342,156. But just as in this European patent application, the colored materials are not separated from teh glucose polymer and the product obtained is not heat-stable. Furthermore, it is well know that to be effective, such chromatographic molecular sieving processes should be used at high temperatures so as to limit the diffusional stresses at the core of the particles of the adsorbent formed by the resins. This makes it possible to lower the viscosity of the solutions, and this lowering of the viscosity makes it possible, for the same pressure drops, either to increase the dry matter content of the syrups to be chromatographed, or to increase their flow rate inside the installation. However, the heat-instability of the polydextrose subjected to the chromatography does not allow this purification to be performed at temperatures greater than 50° C. and, even under these conditions, the product obtained is more colored than the product subjected to purification.

European Patent Application No. 368 451 proposes to obtain a low-calorie glucose polymer by enzymatically hydrolyzing a pyrodextrin, by optionally chromatographing the hydrolysis product obtained so as to remove therefrom, as much as possible, the glucose and the maltose, and then, optionally, finally by hydrogenating it.

However, in the pyrodextrine, the 1-6 bonds are not predominant and the products are highly susceptible to the action of amyloglucosidases. As a result, the non-hydrolyzable fraction of the pyrodextrin represents only a small portion of this pyrodextrin, even less than 50%, and consequently, the low-calorie polymer which may be extracted by chromatography cannot be produced with a good yield. Furthermore, in the proposed process, the chromatography also cannot be used at high temperatures, otherwise an intensely colored low-calorie polymer is obtained which becomes extremely difficult to hydrogenate because these colors rapidly posion the catalyst.

Patent Application PCT 92/14761 proposes a polydextrose containing only few reducing glucose groups. Such a product is obtained especially by catalytic hydrogenation of a polydextrose solution of a pH between 3 and 9, at a temperature of about 20° to 200° C., at a hydrogen pressure between 3.5 and 200 bars. The product obtained is not intensely colored and it is heat-stable. It is unfortunately not as low in calories as possible and still contains molecules which confer some bitterness on it, such as anhydroglucose or citric acid esters, as well as low molecular weight products such as sorbitol, maltitol and the like, which confer a sweet taste on it and which are not highly viscosity-promoting and vary substantially lower the equilibrium relative humidity of the products obtained.

None of the above-mentioned processes therefore makes it possible to obtain, from glucose, an ideal filler which is:

as regards its organoleptic properties:
  as faintly sweet as possible
  colorless,
  tasteless,
as regards its physical properties:
  as faintly hygroscopic as possible,
  viscous,
  developing a high body effect,
  having high glass transition temperatures,
  having a very high anti-crystallizing power,
  heat-stable,
as regards its chemical properties:
  which does not give rise to Maillard reactions,
  which is neither oxidizable, nor reducible, nor hydrolyzable under the usual conditions for using fillers,
as regards its physiological properties:
  which does not develop high intraluminal osmotic pressure so as not to cause osmotic diarrhoea,
  which has a very low fermentability so as to be neither high in calories not cariogenic and to have a high "fibre" effect on the intestine.

And it is only after a lengthy and difficult work, which indeed seemed never to be able to result in the ideal product described above, that the applicant company, nevertheless, succeeded in developing a soluble glucose polymer predominantly composed of 1-6 bonds, characterized by the fact that it possesses practically no reducing power and that its content of products of molecular weight less than or equal to 182 is extremely low.

The subject of the present invention is thus a soluble glucose polymer predominantly composed of 1-6 bonds, which has a content of reducing sugars less than 0.5% by weight, preferably less than 0.25% and still more preferably less than 0.15%, as well as a content of products of molecular weight less than or equal to 182 less than 1%, preferably less than 0.75%, and still more preferably less than 0.50%.

The content of reducing sugars is expressed as glucose, in weight relative to the dry weight of the product analyzed, and it is measured by the BERTRAND method.

The content of products of molecular weight less than or equal to 182 is expressed, for its part, in percent by weight on the dry product analyzed and it is measured by enzymatic assay or by chemical assay, as will be explained in the examples.

Glucose polymer predominantly composed of 1-6 bonds is understood to mean condensation polymers which are produced essentially from glucose under the combined action of heat and acids or acidic catalysts, or salts in media with low water content. The dextrans, which are obtained by microbial fermentation of sucrose and essentially composed of glucose $\alpha$ 1-6 glucose bonds, are consequently excluded from this invention.

Such polymers have been described many times and they can be obtained by processes such as those described especially in U.S. Pat. Nos. 2,436,967; 3,766,165; 4,965,354 and 5,051,500.

Currently marketed glucose polymers are obtained from glucose and citric acid. More specifically, they are obtained by heating and melting dextrose (crystallized glucose) in the presence of 5 to 15% sorbitol, also melted, and 0.5 to 3% by mol of citric acid. This melted mixture is then kept at a temperature of between 140° and 195° C., under reduced pressure, so as to remove therefrom, progressively, the water which is formed during the polymerization.

Such a soluble glucose polymer is an article commonly found on the market, more generally known under the name of "Polydextrose". One quality currently present on the market is marketed by the company PFIZER under the trademark LITESSE.

These glucose polymers processes a reudcing power which, expressed in Dextrose Equivalent (D.E.), is between about 6 and about 15. This reducing power is due to the presence of free glucose and hemiacetal reducing ends present at the end of the polymer chain. They also contain citric acid and unreacted sorbitol (glucose, sorbitol and citric acid all three having a molecular weight less than or equal to 182). There are also present therein about 4% levoglucosan and citric acid esters which confer a bitter taste on these products.

It may also be mentioned that in the case of the LITESSE product, the free and esterified citric acid contents were reduced by special treatment on ionexchange resins.

Other glucose polymers, which are not commercialized to the knowledge of the Applicant but which are preferred as raw material within the framework of the production of the products according to the invention, are obtained much more economically simply by carrying out the condensation of the glucose in the presence of an inorganic acid in catalytic quantities instead of a polycarboxylic acid. These polymers may optionally be obtained by carrying out the condensation of glucose in the presence of sorbitol, but the Applicant Company has observed that this procedure was not necessary although the sorbitol-free polymers obtained under these conditions have a much more pronounced color and taste than those obtained from glucose, sorbitol and citric acid.

These glucose polymers, preferably obtained without the use of sorbitol, also possess a reducing power between about 6 and about 15. This reducing power is also due to the presence of free glucose and hemiacetal reducing ends present at the end of the polymer chain. Levoglucosan and other glucose degradation products are also present therein.

These polymers are conveniently obtained by heating and melting dextrose (crystallized glucose) in the presence of 5 to 500 parts per million by weight of sulfuric acid. This melted mixture is then kept at a temperature of between 140° and 195° C., under reduced pressure, until a DE of between about 6 and 15 is obtained.

According to the present invention, the process for producing the soluble glucose polymer conforming to the invention is one in which a glucose polymer predominantly composed of 1-6 bonds is subjected to a hydrogenation stage and to a molecular sieving stage, especially on membranes or by chromatography on adsorbent materials, so as to remove the molecules of molecular mass less then or equal to 182.

Using these two combined hydrogenation and molecular sieving stages, a product which is heat-stable and which has a satisfactory flavor, color and taste, is thus obtained.

According to a particularly advantaeous embodiment of the process conforming to the invention, the hydrogenation stage is carried out before the molecular sieving stage, which has substantial advantages in spite of the fact that the quantity of material to be hydrogeneated is then greater. Indeed, when the molecular sieving is carried out on the previously hydrogenated glucose polymer, therefore no longer or essentially no longer possessing reducing power, it follows that not only is the molecular sieving carried out on a product already decolorized by hydrogenation but that in addition the temperature conditions necessary for an effective fractionation to be obtained become ineffective on the product to be fractionated. In other words, under these conditions, the molecular sieving no longer results in any degradation of the product, especially as regards the formation of colored or bitter products, and the removal of these degradation products which are already present proves to be equally effective.

According to a preferred embodiment of the process conforming to the invention, prior to the hydrogenation and molecular sieving stages, the glucose polymer predominantly composed of 1-6 bonds is subjected to a hydrolysis by means of enzymes capable of degrading the glucose-glucose bonds.

Preferably, the said enzymes consist of α-amylase, amyloglucosidase and/or enzymes capable of hydrolyzing the α 1-6 bonds of starch, such as isoamylase or pullulanase.

When the hydrogenization is performed on a glucose polymer obtained by catalyzing the condensation of glucose in the presence of sorbitol by means of citric acid, such as polydextrose, the hydrogenation is preferably carried out in alkaline medium since in this case the Applicant Company has observed that a low-calorie soluble glucose polymer of extremely neutral flavor was obtained. Indeed, the slightly alkaline pH combined on the one hand with the high temperature at which the hydrogenation occurs and on the other hand with the highly reducing environment, makes it possible to hydrolyze, without coloring the polymer, the ester bonds linking the citric acid with this polymer.

The hydrolysis of these bonds makes it possible to destroy the citric acid esters and thus to debitter the polymer as much as possible. Such a alkaline hydrolysis however cannot be performed outside the hydrogenation conditions since an extremely degraded and colored polymer would then be obtained.

The preliminary enzymatic hydrolysis of the glucose polymers predominantly having 1-6 bonds makes it possible to obtain soluble glucose polymers conforming to the invention which are particularly low in calories, not very digestible and not very cariogenic. In order to carry out the enzymatic hydrolysis, the glucose polymer is dissolved in water to a dry matter content of about 20 to 70%, preferably 20 to 45%, so as to undergo the hydrolysis, preferably by means of at least one saccharifying enzyme such as amyloglucosidase.

More preferably, and although this is not necessary in all cases, this enzymatic action of amylogucosidase may be preceded by an alpha-amylase action. Like-wise, the saccharification treatment can be followed or accompanied by the action of an alpha-amylase and/or a pullulanase.

The quantities and the conditions for the action of the various enzymes optionally used for the preliminary enzymatic hydrolysis of the polymers are chosen from the following:

amyloglucosidase: 4000 to 400,000 international units per kilogram of dry substrate, temperature of 50° C. to 60° C., duration of action from 30 to 72 hours, pH from 5.0 to 6.0, alpha-amylase: 20 to 2000 KNU u (kilo Novo Units) per kilogram of dry substrate, temperature from 50° C. to 60° C., duration of action from 16 to 30 hours.

pullulanase: 150 to 15,000 ABM units.

The enzymes used may be of bacterial or fungal origin.

Within the framework of the present invention, the hydrogenation of the glucose polymer in which the 1-6 bonds are predominant, having optionally undergone an enzymatic hydrolysis and having optionally undergone a molecular sieving, is carried out in a manner known per se by hydrogenation in the persence of RANEY nickel or by hydrogenation in the presence of noble metals.

This hydrogenation is preferably carried out after purification of the raw material, for example by treatment over activated charcoal before or after demineralization on ion-exchange resins. The hydrogenation may be carried out for example in the presence of RANEY nickel, at a temperature of 130° to 140° C., at a hydrogen pressure of about 50 bars.

The hydrogenation is generally performed until a percentage of residual reducing sugars less than 0.5%, preferably less than 0.25% and still more preferably less than 0.15% dry matter, is obtained.

Generally, the molecular sieving is carried out on a previously filtered syrup and then demineralized and concentrated up to a dry matter content practically between 20 and 60%, preferably between 25 and 55%.

This molecular sieving, preferably performed by chromatographic fractionation, is carried out in a manner known per se, batchwise or continuously (simulated fluidized bed), on cationic resin type adsorbents, or on strongy acidic zeolites, preferably charged by means of alkali or alkaline earth metal ions such as calcium and magnesium, but more preferably by means of sodium ions.

Examples of such processes are described especially in U.S. Pat. Nos. 3,044,904; 3,416,961; 3,692,582; FR 2,391,754; 2,099,336; U.S. Pat. Nos. 2,985,589; 4,226,977; 4,293,346; 4,157,267; 4,182,633; 4,332,623; 4,405,455; 4,412,866; 4,422,881 French Patent No. 2,352,829, and WO 92/12179. According to a preferred embodiment, the chromatograhic fractionation is performed using the process and equipment described in U.S. Pat. No. 4,422,881 of which the applicant company is proprietor. Irrespective of the chromatographic process chosen, a strong cationic resin, employed in te sodium form and cross-linked with about 4% to 10% divinylbenzene, is preferably used as regards the adsorbent. The resins are advantageously of homogeneous particle size of between 100 and 800 microns.

The choice of chromatographic fractionation parameters among which there may be noted more particularly the rate of elution, the rate of supply of starting polymer, optionally previously hydrogenated and optionally hydrolyzed, the rate of extraction of the fraction containing the low-calorie soluble polymer, the rate of the fraction containing the low molecular weight impurities and the composition of the zones of desorption, adsorption and enrichment, is explained and illustrated in the examples.

The choice of these parameters is made in such a manner that the fraction X1, containing the soluble glucose polymer, has a content of products of molecular weight less than or equal to 182 which is extremely low, and in practice less than 1%, preferably less than 0.75%, and still more preferably less than 0.5%.

In order to achieve this result, these parameters are chosen as follows, when the chromatographic fractionation is performed using the process and equipment which are described in U.S. Pat. No. 4,422,881 and when the adsorbent used is a cationic resin of small particle size, whichis cross-linked with 8% divinylbenzene and is used in the sodium form:

rate of elution from 70 to 700 l/h/m$^3$ of adsorent, rate of supply of staring polymer, optionally hydrogenated and optionally hydrolyzed, from 10 to 100 l/h/m$^3$ of adsorbent, rate of extraction of the fraction containing the soluble glucose polymer from 80 to 800 l/h/m$^3$ of adsorbent (fraction X1), rate of extraction of fraction X3, essentially consisting of water, hydroxymethylfurfural and levoglucosan (highly adsobed onto the resins): 80 to 800 l/h/m$^3$ of adsorbent, rate of the fraction containing the low molecular weight impurities from 20 to 200 l/h/m$^3$ of adsorbent (fraction X2).

The chromatographic fractionation stage resulting in the soluble glucose polymer brings about the simultaneous production of the fraction X2, highly enriched with glucose or with sorbitol, and with levoglucosan, and also containing oligosaccharides with a low degree of polymerization. This fraction X2 contains the largest portion of the levoglucosan which was removed from the polymer. Another portion of this levoglucosan is also present in the fraction X3 preceding, on each cycle, the discharge of the soluble glucose polymer contained in the fraction X1. This fraction X3 also contains hydroxymethylfurfural or its hydrogenated derivatives strongly adsorbed by the resins and which were therefore also removed from the purified polymer.

Fraction X2, essentially containing the low molecular weight impurities such as glucose, sorbitol and levoglucosan, is preferably extracted at a rate such that the dry matter which is contained therein does not repesent more than 20% of the dry matter entering into the chromatographic system, which guarantees, in this case, a solube glucose polymer extraction yield greater than 80% of the polymer actually present in the syrup to be purified.

By virtue of the process conforming to the invention, wich takes advantage of the benefits obtained both by hydrogenation and by molecular sieving, it is possible to obtain a low-calorie soluble glucose polymer in which the 1–6 bonds are predominant and whose organoleptic, physical, chemical and physiological properties are not comparable with those of products of this range which already exist but whose development has always been limited by their intrinsic defects, which have already been mentioned above.

Figure 1:
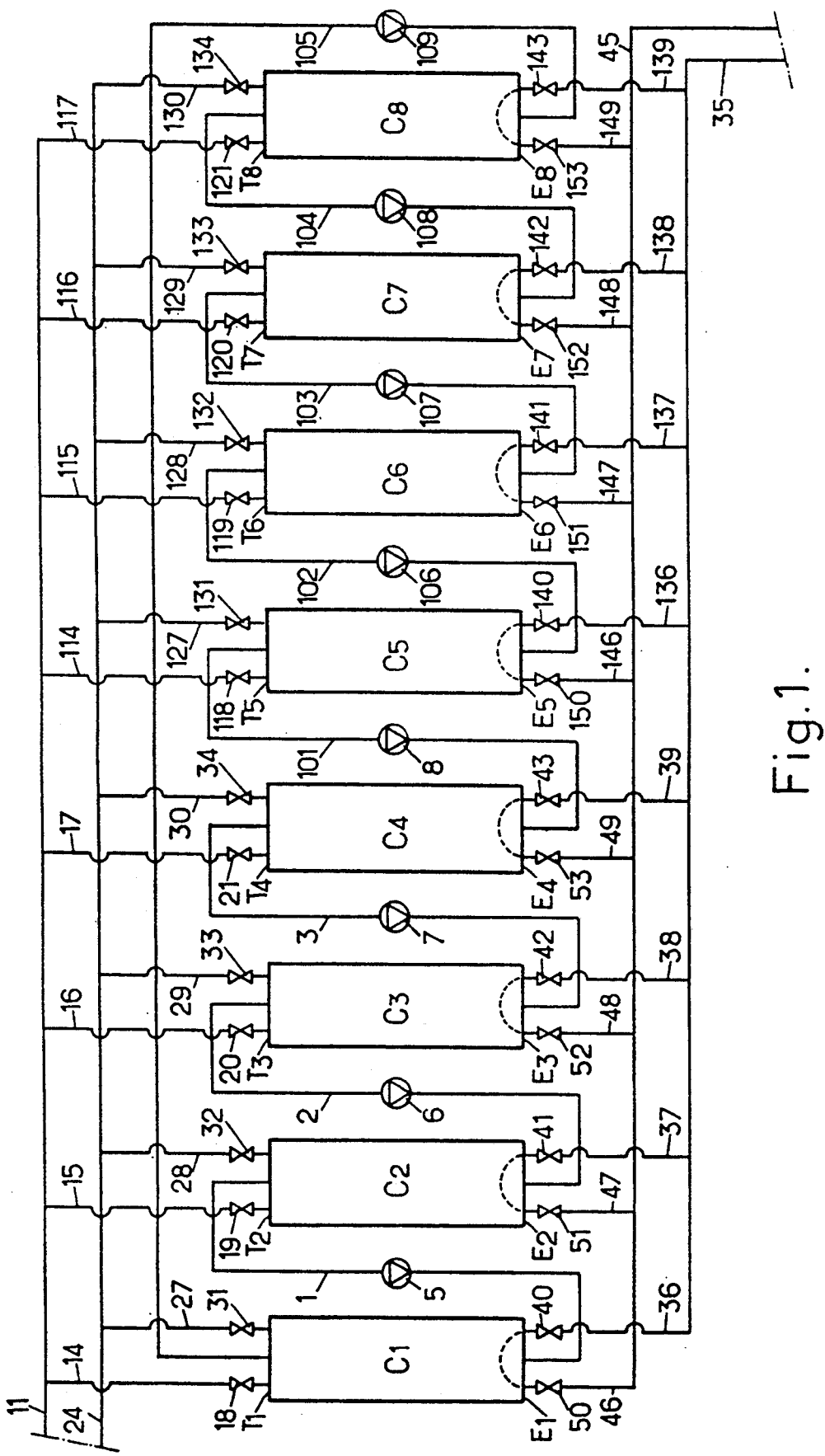
FIG. 1 shows an installation for the fractionation of hydrogenated polydextrose described in U.S. Pat. No. 4,422,811.

The description of the few examples which follow will make it possible to understand more clearly what the invention actually consists of. They are however given here only by way of illustration and cannot constitute a limitation only to the products and processes proposed, which represent in this field a significant technological advance.

EXAMPLE 1

Polydextrose A from PFIZER, whose chemical analysis is the following (in % of the dry matter):
Dextrose Equivalent: 8.7
free glucose: 3.5
total glucose: 85.8
free sorbitol: 1.7
total sorbitol: 9,3
free citric acid: 0.6
total citric acid: 1.1
levoglucosan: 2.8
is dissolved in water to a dry matter content of 30%. The pH of the syrup obtained is adjusted to 5.5 by means of a sodium hydroxide solution, then this syrup is divided into five batches a, b, c, d and e, all heated to 55° C. and in which there are introduced:

batch a: 1.5% of amyloglucosidase AMIGASE TS 300 from GIST and 1.5% of alpha-amylase TERMAMYL 120 L from NOVO batch b: 1.5% of amyloglucosidase AMIGASE TS 300 from GIST 1.5% of alpha-amylase TERMAMYL 120 L from NOVO 2% of pullulanase PULLUZYME 750 L from ABM batch c: 1% of fungal alpha-amylase M.K.C. LF 40 from MILES batch d: 1% of fungal alpha-amylase M.K.C. LF 40 from MILES 2% of pullulanase PULLUZYME 750 L from ABM batch e: nothing.

The percentages indicated above are expressed in weight of commercial enzyme relative to the weight of dry polymer.

After 24 hours of enzymatic hydrolysis or of constant temperature, the batches are acidified to pH 3,5 and they are heated to 80° C. in order to denature the enzymes. All these syrups are then purified in a conventional manner by charcoal treatment and demineralization on cationic and anionic resins in order to obtain syrups which are colored and possess a bitter taste.

On the syrups obtained, there is performed by analysis:

of the free citric acid by means of the BOEHRINGER kit ref. 139076, of the total citric acid by the same method, but after performing a saponification under the following conditions: 25 ml of 0.5N sodium hydroxide are added to 5 ml of sample; the mixture is stirred for 30 minutes at room temperature and it is then neutralized to pH 7–8 with N HCl; the total volume is then adjusted to 50 ml in order to assay the total citric acid, of the glucose by means of the BOEHRINGER kit ref. 716251 of the sorbitol by the sorbitol dehydrogenase method published in "Methods of enzymatic analysis"BERG-MEYER-Hans Ulrick Editor 1965-VERLAG CHEMIE GmbH, ACADEMIC PRESS-p 167 to 170, of the 5-HMF by high-performance liquid chromatography on an H+ column and a UV detector at 283 nm, of the levoglucosan by capillary column gas chromatography, via its bisilyltrifluoroacetamide derivative with methyl alpha-D-glucoside as internal standard.

The analysis obtained is the following as regards the free glucose and free sorbitol contents.

| Batch | a | b | c | d | e |
|---|---|---|---|---|---|
| free glucose | 5.1 | 5.2 | 6.7 | 7.3 | 3.5 |
| free sorbitol | 1.7 | 1.7 | 1.7 | 1.7 | 1.7 |
| Dextrose Equivalent | 8.9 | 9.0 | 10.5 | 11.1 | 8.0 |

A first portion of batch e was concentrated to 70% dry matter and was then spray-dried in order to provide a yellow powder (product A).

Batches d and another portion of batch e were then subjected to catalytic hydrogenation under the following conditions: temperature 140° C., duration 6 hours, RANEY nickel catalysis, hydrogen pressure 50 bars, concentration 30%, pH 8.0. After filtration of the catalyst and removal of the salts on cationic and anionic resins, colorless syrups, sweet in taste and still possessing a slight bitterness were obtained.

The hydrogenated batch e was concentrated to 70% dry matter content and was then spray-dried in order to provide a yellowish powder (product B).

Their free sorbitol content was, for batch d, 9.7% and, for batch e, 5.7%.

The reducing sugar content of these syrups is 0.5% and their total citric acid content is less than 0.07%, the detection limit of the analytical method. The levoglucosan content remained unchanged and is equal to 2.8%.

For the hydrogenated syrup d, the content of products of molecular mass less than or equal to 182 is 12.5% (that is to say 9.7% free sorbitol and 2.8% levoglucosan), and it is 8.5% for the hydrogenated syrup e (5.7% free sorbitol and 2.8% levoglucosan).

The fractionation of the hydrogenated polydextrose corresponding to batches d and e was carried out in the continuous chromatographic separation installation whose construction and operating details are described in U.S. Pat. No. 4,422,881, these details being repeated only where they are essential for understanding the process. This installation comprises, as shown in FIG. 1 of the American patent (repeated here as FIG. 1 and for whose detailed explanation reference can be made to the said American patent), eight columns or stages C1 to C8 of 200 liters each, filled with strong cationic resin in sodium form and of a particle size between 180 and 280 microns of the PCR 732 type from PUROLITE.

Figure 2:
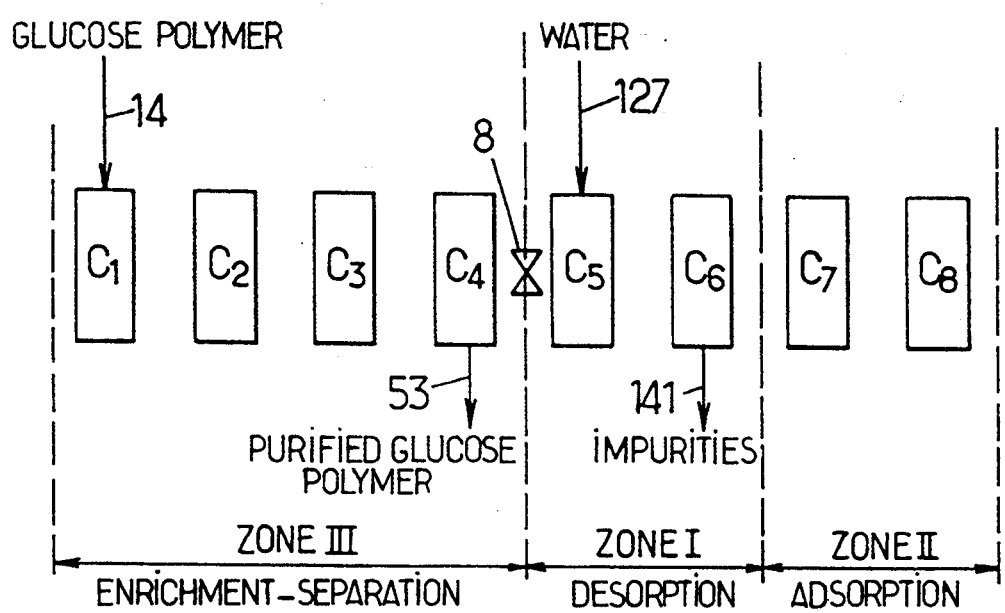
FIG. 2 is a schematic representation of the installation shown in FIG. 1.

By locking the electrovalves, a two-stage zone I of desorption, a two-stage zone II of adsorption, and a four-stage zone III of enrichment and separation of the hydrogenated polydextrose which is relatively less adsorbed and the low molecular weight compounds which are relatively more adsorbed, are established in this installation, as shown in FIG. 2 which is a schematic representation of the installation of FIG. 1 and in which there are only represented:

columns C1 to C8, the device for closing, in this case the electrovalve 8, the pipes for supplying water and hydrogenated polydextrose to be fractionated, containing products of low molecular mass, shown in 127 and 14 respectively, the pipe 141 for extracting the low molecuar weight impurities of the sorbitol, levoglucosan and glucose type (fraction X2), and the pipe 53 for extracting the purified soluble glucose polymer according to the invention (fraction X1).

The closing device 8 maintains, in the adopted configuration, a total tightness between, on the one hand, the zone III, which is a zone of enrichment at the end of which the purified glucose polymer is recovered and, on the other hand, the zone I of desorption of the impurities essentially consisting of sorbitol, glucose and levoglucosan, zone at the top of which the water for desorption is introduced.

This closing device determines the direction of passage of the liquid phase over the selective adsorbent. A timer, adjusted to 1800 seconds, ensures, for the rates indicated in Table 1, a supply of water in the first column of zone I which is sufficient to obtain the desorption of the impurities, namely essentially sorbitol, glucose, levoglucosan and hydroxymethylfurfural, and a supply of a volume of hydrogenated polydextrose to be purified in the first stage of zone III which is compatible with the volume of adsorbent and its adsorptive capacity, so as to obtain a yield of extraction of the polyglucose according to the invention at least equal to 80% of the hydrogenated polydextrose serving as raw material for the chromatography. At the end of the 1800 seconds, all the inlets and outlets, as well as the closing device 8, are shifted one stage towards the right.

The above-mentioned extraction yield is kept constant by adjusting the output of the pump, not shown, for extracting the absorbed impurities. The discharge of the fraction X1, optionally preceded by a fraction X3 containing some levoglucosan and hydroxymethylfurfural, very strongly adsorbed onto the sodium type resins, is performed at atmospheric pressure. Its constant rate results from the differene between the supply rates and the extraction rate.

The hydrogenated polydextrose which is introduced into the installation at the top of the zone of enrichment and separation III, has a dry matter content close to 30%.

The temperature inside the separating columns is maintained at about 70° C.

the fraction X1 constituting the soluble glucose polymer according to the invention, is preceded by a fraction X3 essentially consisting of levoglucosan and hydrogenated derivatives of hydroxymethylfurfural at very low concentration but very high level. This impurity-containing fraction is advantageously removed during the first 15 minutes of each cycle, which makes it possible to substantially increase the concentration and the purity of the fractions of soluble glucose polymers according to the invention.

Table 1 below shows, for the conditions for operating the installation which are indicated therein, the levels and concentrations obtained for the three fractions X1, X2 and X3.

more colored than following the purification obtained in the case of Example 1 just before the hydrogenation.

A portion of the fraction X1 thus purified is concentrated to a dry matter content of 30% and is then subjected to hydrogenation as in the case of Example 1.

After 8 hours of hydrogenation, a syrup is obtained which, after demineralization, is colorless, flavorless and which contains 0.45% of reducing sugars and 0.3% of molecules of molecular weight less than or equal to 182. Another portion of this fraction X1 thus purified is concentrated to a dry matter content of 70% and is then dried by spray-drying in order to provide a yellowish

TABLE 1

| | | EXAMPLE 1 | | EXAMPLE 2 |
|---|---|---|---|---|
| | | d | e | e |
| Rate of supply of hydrogenated or non-hydrogenated polydextrose of 30% dry matter | | DM* 25.7 kg/h equivalent to 77 l/h | DM* 25.7 kg/h equivalent to 77 l/h | DM* 24.7 kg/h equivalent to 73 l/h |
| Rate of water supply | | 272 l/h | 272 l/h | 293 l/h |
| Rate of fraction X1 constituting the purified glucose polymer | | 277 l/h equivalent to 138.5 l/h | 277 l/h equivalent to 138.5 l/h | 287 l/h equivalent to 143.5 l/h |
| Rate of fraction X2 containing the impurities: sorbitol, levoglucasan, glucose | | 72 l/h | 74 l/h | 79 l/h |
| Fraction X1 | Dry matter in g/l (from 900 to 1800 seconds) | 159 g/l | 166 g/l | 150.5 g/l |
| | Dry weight | 22.0 kg/h | 23 kg/h | 21.6 kg/h |
| | Level of impurities (sorbital, levoglucosan, glucose) | 0.27% | 0.26% | 0.3% |
| | Yield of extraction of the polymer | 85.6% | 89.5% | 87.4% |
| Fraction X2 | Dry matter in g/l | 41 g/l | 31.5 g/l | 27.8 g/l |
| | Dry weight | 3 kg/h | 2.27 kg/h | 2.2 kg |
| | Level of impurities (sorbitol, levoglucosan, glucose) | 82% | 77% | 51.8% |
| Fraction X3 (0 to 900 sec) | Rate | 138.5 l/h | 138.5 l/h | 143.5 l/h |
| | Dry weight | 0.66 kg | 0.40 | 0.9 kg/h |

*DM: dry matter

EXAMPLE 2

A third portion of batch e, obtained in the preceding example, was chromatograhed without being hydrogenated beforehand.

The conditions for the supply and extraction of the fluids entering and leaving the chromatographic system are presented in Table 1. The separation temperature used is 65° C., the configuration of the zones inside the system remained the same as well as the time of 1800 seconds requiring the shifting to the right of all the inlets and outlets of the system.

It can be observed that, compared with the hydrogenated product, the separation of the impurities (sorbitol, glucose and levoglucosan) is more difficult: the extraction yield obtained is slightly lower, and for the same purity of glucose polymer, the chromatographic system should be less loaded and more water used than in the case of the hydrogenated product "e".

A very intense coloration of fraction X1 is in addition observed. This coloration, which already exists in the product to be chromatographed, increases during the chromatography and becomes concentrated in this fraction X1.

The fraction X1 obtained is then decolorized by charcoal treatment and then demineralized on cationic and anionic resins. Although this treatment improves the color thereof, the resulting syrups are nevertheless powder (product C).

For the two examples given, the preferred conditions for performing the chromatograhpic fractionation are those for which the content of impurities of molecular weight less than or equal to 182 of the fraction X1 isless than 1%, preferably less than 0.75% and still more preferably less than 0.50%. Such a richness in products of molecular mass less than or equal to 182 makes it possible to obtain a product which is completely neutral from the point of view of the taste, that is to say neither sour, nor sweet, nor sweet, nor salty, nor bitter; completely colorless, extremey low in calory, noncariogenic, heat-stable, not generating Maillard reactions, possessing a high glass transition temperature and a high ERH, more viscous and generating more body than the products of the prior art.

Under these conditions, the yield of extraction of the soluble glucose polymer according to the invention, which can be expressed as being the ratio of the weight of soluble polymer extracted in fraction X1 relative to the weight of hydrogenated or non-hydrogenated polydextrose contained in the supply syrup, is greater than 80%.

The fraction of soluble glucose polymer according to the invention may then be concentrated in a manner known to any person skilled in the art, for example using falling film devices operating under vacuum, and then dried by processes such as spray-drying.

EXAMPLE 3

500 kg of anhydrous dextrose and 25 liters of water are introduced into a vitrified steel reactor provided with a stirrer and a double thermostable jacket.

The jacket is heated until the dextrose dissolves completely and then 10 grams of sulfuric acid, previously diluted in a small amount of water, are added. The reactor was then placed under vacuum and its temperature raised to 155° C. over 8 hours so as to obtain a soluble glucose polymer corresponding to the following analysis:

dextrose equivalent: 11.9
free glucose: 5.2%
anhydroglucose: 0.89%

The paste thus obtained, which is very brown and has a strong caramel odor, was taken up in hot water so as to form therefrom a solution wiht about 40% dry matter content.

This solution was then subjected to te action of an amyloglucosidase by means of 25,000 international units of enzymatic activity per kilogram of dry substrate, at a temperature of 55° C. and at a pH of 5.5, for 60 hours. It was then decolorized on a granular charcoal column and then demineralized on a battery of ion-exchange resins comprising, in series, a strong cationic resin, then a strong anionic resin and finally a mixed bed composed of strong cationic and anionic resins.

The syrup obtained showed, in this case, the following analysis:

dextrose equivalent: 14.8
free glucose: 8.5%
anhydroglucose: 0.9%

Its hydrogenation was carried out at a temperature of 140° C. for 6 hours by means of Raney nickel, at a hydrogen pressure of 50 bars, at a pH of 7.0 and at a concentration of 30%.

After filtration of the catalyst and removal of the salts on strong cationic and anionic resins, a colorless syrup was obtained which was concentrated to a dry matter content of 50% in order to undergo the chromatography under the conditions which were described in Example 1.

This syrup, subjected to the chromatogaphy, corresponded to the following analysis:

reducing sugars: 0.12%
sorbitol: 8.8%
anhydroglucose: 0.9%

The fraction X1 collected after chromatography, after a final passage on a mixed bed of strong cationic and anionic resins was concentrated to 70% dry matter and was then spray-dried in order to provide a polymer powder according to the invention whichis perfectly white, colorless and without any flavor or specific ordor.

The product obtained (PRODUCT D) contained less than 0.2% sorbitol and no other detectable impurities of molecular weight less than or equal to 182.

EXAMPLE 4

The organoleptic and physico-chemical properties of the products of the invention were compared, in what follows, with those of the prior art.

To do this, the following were retained as prior art products:

polydextrose A, demineralized on resins and corresponding to the product marketed by the company PFIZER under the trade mark LITESSE II, the same product after catalytic hydrogenation (batch e of Example 1), the chromatographed fraction X1 obtained in Example 2 after chromatoraphy and purification but before catalytic hydrogenation the product of Example 3

These products are called A, B, C and D respectively as already specified in the preceding examples.

a) Chemical analysis and the appearance

The chemical analysis and the appearance of these products in powdered form or in solution are compared in Table 2 below:

TABLE 2

|  | A | B | C | D |
|---|---|---|---|---|
| Dextrose equivalent | 8.0 | 0.05 | 5.3 | 0.10 |
| Free glucose | 3.5 | 0 | 0.3 | traces |
| Free sorbitol | 1.7 | 5.7 | 0 | 0.2 |
| Levoglucosan | 2.8 | 2.8 | traces | traces |
| Polymer | 92% | 91.5% | 99.7% | 99.8% |
| Appearance of the powder | yellow powder | white powder | yellow powder | white powder |
| Appearance in 50% solution | yellow | yellowish | yellow | colorless | b) Organoleptic properties

A taste panel qualified 10% solutions of these powders in water in the following manner:

product A: bitter, very slightly sweet
product B: slightly bitter, slightly sweet
product C: very slightly bitter, very slightly sweet
product D: completely neutral c) Viscosity in aqueous solution Aqueous solutions at 55% dry matter content were prepared from products A, B, C and D. Their viscosity was measured at 20° C. by means of a BROOKFIELD viscometer. The results obtained are the following:

product A: 86 centipoises
product B: 85 centipoises
product C: 106 centiposises
product D: 108 centipoises The product D according to the invention is therefore the most viscous and thus confers the maximum body or unctunousness to the products containing it.

d) Water activity

The water activity was measured on the same aqueous solutions at 55% dry matter content. The results obtained are the following:

product A: 0.950
product B: 0.955
product C: 0.965
product D: 0.965

The aqueous solutions of the products according to the invention therefore have a water activity which is low and do not excessively lower the equilibrium relative humidity of the products containing it.

e) Heat-stability

The heat-stability of the products A, B, C and D was evaluated.

To do this, the color obtained on boiling was estimated during the manufacture of sweets produced by means of 50% high-purity crystallized maltitol of trade mark MALTISORB ® marketed by the Applicant and 50% of products A, B, C and D.

The boiling was performed at atmospheric pressure at temperatures of 160° and 200° C.

The following results were obtained:

TABLE 3

|  | 160° C. | 200° C. |
|---|---|---|
| 50% product A + 50% MALTISORB ® | yellow | chestnut |
| 50% product B + 50% MALTISORB ® | pale yellow | yellow |
| 50% product C + 50% MALTISORB ® | yellow | chestnut |
| 50% product D + 50% MALTISORB ® | very pale yellow | pale yellow |

The product according to the invention is therefore distinctly more heat-stable than the products of the prior art since it allows the production of distinctly less colored boiled sugars as shown in Table 3.

f) Glass transition temperature and residual water content.

The glass transition temperature (Tg) and the residual water content of the boiled sugars obtained in the preceding example were measured and are presented in Table 4 below:

TABLE 4

| Boiling temperature | Product A | | Product B | | Product C | | Product D | |
|---|---|---|---|---|---|---|---|---|
|  | % residual water | Tg °C. | % residual water | Tg °C. | % residual water | Tg °C. | % residual water | Tg °C. |
| 160° C. | 3.0 | 40 | 3.1 | 38 | 2.2 | 52 | 2.0 | 54 |
| 200° C. | 1.3 | 60 | 1.5 | 57 | 1.0 | 69 | 0.8 | 73 |

For the same residual water content, the glass transition temperature of the sweets obtained by means of the product according to the invention is higher, which results in a better heat resistance for the said sweets by making any creep phenomenon impossible. In addition, the sweets obtained with the product according to the invention are easier to boil and to dehydrate, do not become colored and have a much better taste, the sweet maltitol taste not being altered by any bitter note as is the case for the other sweets.

g) Hygroscopicity of the boiled sugars

The hygroscopicity of the sweets obtained in a after boiling at 160° and 200° C. was estimated by measuring their water regain in an atmosphere at 66% relative humidity at 20° C., after 1 and 7 days. The following results, presented in Table 5 and showing the percentage increase in the weight of the sweets, were obtained.

TABLE 5

|  |  | Product A | Product B | Product C | Product D |
|---|---|---|---|---|---|
| 160° C. | 1 d | 1.65 | 1.80 | 1.06 | 0.95 |
|  | 7 d | 5.02 | 5.62 | 3.20 | 2.80 |
| 200° C. | 1 d | 1.36 | 1.47 | 1.22 | 1.10 |
|  | 7 d | 4.22 | 4.98 | 3.61 | 3.20 |

Whether they are obtained by boiling at 160° C. or at 200° C, the boiled sugars obtained with the product according to the invention are always less hygroscopic than those obtained with the products of the prior art.

h) Cariogenicity

The cariogenicity of the products A, B, C and D was tested according to a test developed by the applicant company.

This simple test is based on the vitro determination of the acidification of a given quantity of the product to be tested inoculating the medium with saliva. It is based on assessing the drop in pH over time of a culture broth containing the product to be tested, after inoculation with saliva obtained from several donors, compared with a control culture broth containing no carbohydrate. It should be underlined that this test is not sufficient to characterize, in an absolute manner, the non-cariogenicity of a product, because its results can vary, for example, according to the quality of the saliva used, but it makes it possible, neverthertless, to establish valid comparisons between various products.

The detailed procedure for this test is the following:

A series of tubes containing 10 ml of a carbohydrate-free nutrient culture medium (trypticase medium containing 2% dry matter) at pH 7, were prepared and these tubes were sterilized by treating in an autoclave at 120° C. for 20 minutes.

1 ml of sterile water is introduced into a first series of five tubes in order to make a control series.

1 ml of an 18% (w/V) solution of the product to be tested is introduced into a second series of five tubes.

Then the five tubes of each series are inoculated with the same volume of 0.2 ml per tube of a one fifth dilution of human saliva collected from five donors.

The formation of acids is then monitored by measuring the pH, a first measurement being performed before incubation and the other measurments being performed after incubations at 30° C. of 3, 6, 13, 18 and 21 hours For a product to be considered as non-cariogenic according to this test, the difference in pH observed between the control after 21 hours and the product to be tested after 21 hours should not be too marked and, in practice, at most equal to 1 unit of pH.

According to this test, only the products B and D proved to be non-cariogenic.

The differences in pH observed after 21 hours on the four products A, B, C and D were the following respectively:

product A: 2.6
product B: 0.8
product C: 1.7
product D: 0.6

The applicant company observed, in addition, that the more extensive the enzymatic hydrolysis undergone by the products according to the invention before the hydrogeneation and chromatographic stages, the better the performances obtained in this test.

i) Osmotic pressure

The weight (Mw) and number (Mn) means molecular weights of products A, B, C and D, were measured.

These were:

|  | Mw | Mn |
|---|---|---|
| product A | 1750 | 750 |
| product B | 1700 | 750 |
| product C | 2380 | 1120 |
| product D | 2500 | 1300 |

Since the osmotic pressure of the aqueous solutions is inversely correlated with the number (Mn) mean molecular weight of products, it can be observed that it is the products according to the invention which develop the minimum osmotic pressure and thus bring about the least problems of digestion.

The small difference between the Mw and the Mn of the products according to the invention also demonstrates the size homogeneity of the molecules constituting these new products and the numerous advantages which stem therefrom.

I claim:

1. A soluble glucose polymer predominantly composed of 1-6 bonds, which has a content of reducing sugars of less than 0.5% by weight, as well as a content of products of molecular weight less than or equal to 182 of less than 1% by weight..

2. A soluble glucose polymer according to claim 1 wherein the content of products of molecular weight less than or equal to 182 is less than 0.75% by weight.

3. A soluble glucose polymer according to claim 1 wherein the content of products of molecular weight less than or equal to 182 is less than 0.5% by weight.

4. A soluble glucose polymer according to claim 1 wherein the content of reducing sugars is less than 0.25% by weight, and the content of products of moecular weight less than or equal to 182 is less than 0.75% by weight.

5. A soluble glucose polymer according to claim 1 wherein the content of reducing sugars is less than 0.25% by weight, and the content of products of molecular weight less than or equal to 182 is less than 0.5% by weight.

6. A soluble glucose polymer according to claim 1 wherein the content of reducing sugars is less than 0.15% by weight, and the content of products of molecular weight less than or equal to 182 is less than 0.75% by weight.

7. A soluble glucose polymer according to claim 1 wherein the content of reducing sugars is less than 0.15% by weight, and the content of products of molecular weight less than or equal to 182 is less than 0.5% by weight.

8. A process for preparing a glucose polymer predominantly composed of 1-6 bonds, which has a content of reducing sugars of less than 0.5% by weight, as well as a content of products of molecular weight less than or equal to 182 of less than 1% by weight, which comprises subjecting a glucose polymer predominantly composed of 1-6 bonds to a hydrogenation stage and to a molecular sieving stage to remove the products of molecular mass less than or equal to 182, to produce said glucose polymer.

9. The process as claimed in claim 8, wherein the hydrogenation stage is performed before the molecular sieving stage.

10. The process as claimed in claim 8, wherein the molecular sieving is performed by chromatography on cationic resins or cationic zeolites.

11. The process as claimed in claim 8, wherein before the hydrogenation and molecular sieving stages, the starting glucose polymer predominantly composed of 1-6 bonds is subjected to a hydrolysis by means of enzymes capable of degrading the glucose-glucose bonds.

12. The process as claimed in claim 11, wherein said enzymes are selected from the group consisting of $\alpha$-amylase, amyloglucosidase, and an enzyme capable of hydrolyzing the $\alpha$ 1-6 bonds of starch, separately or in combination.

* * * * *